Feb. 21, 1939. A. E. BRICKMAN ET AL Re. 21,006
FLEXIBLE CONDUIT WITH END FITTINGS
Original Filed Nov. 18, 1935
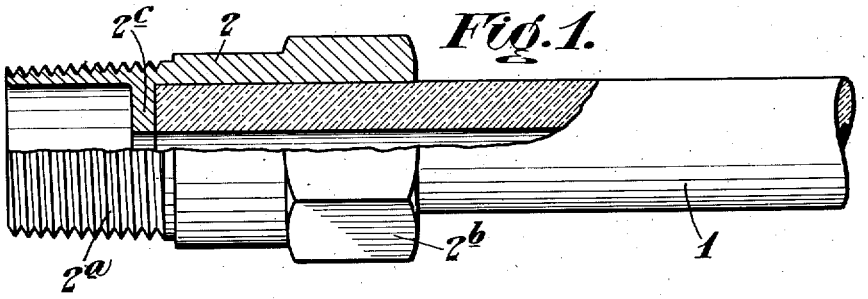
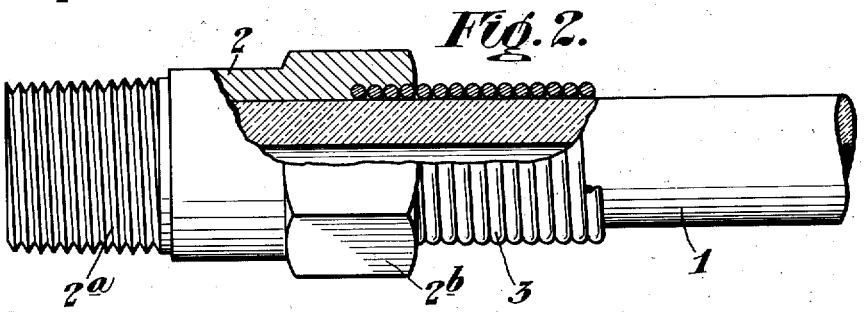
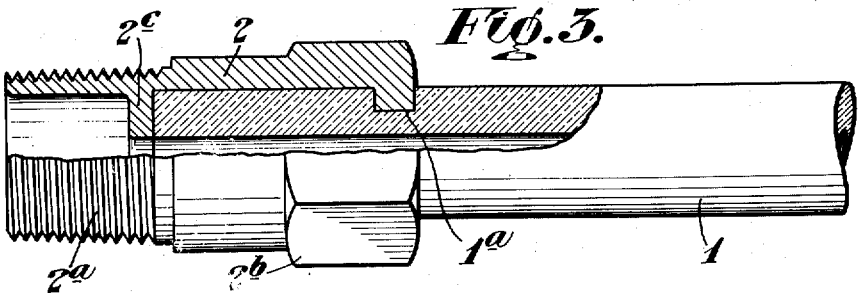
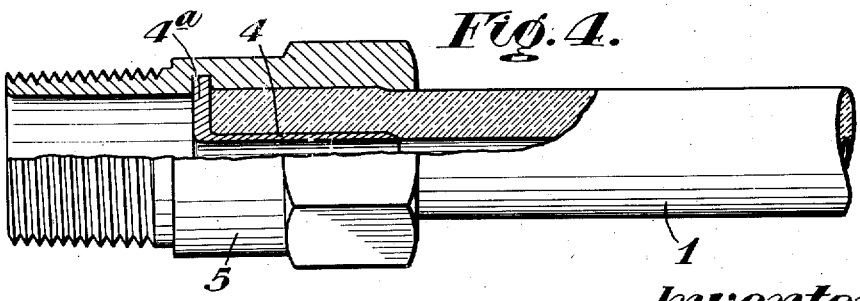
Inventors:
ALAN E. BRICKMAN and
GEORGE A. GLEASON.
by: Usina & Lauber
their Attorneys.

Reissued Feb. 21, 1939

Re. 21,006

UNITED STATES PATENT OFFICE 21,006

FLEXIBLE CONDUIT WITH END FITTINGS

Alan E. Brickman, Rostravor Township, Westmoreland County, Pa., and George A. Gleason, Worcester, Mass., assignors to The American Steel and Wire Company of New Jersey, a corporation of New Jersey Original No. 2,074,770, dated March 23, 1937, Serial No. 50,457, November 18, 1935. Application for reissue December 14, 1938, Serial No. 245,738

1 Claim. (Cl. 285—74)

This invention relates to flexible conduits which must be provided with end fittings. It is particularly concerned with flexible conduits for carrying fluid to hydraulic automobile brakes, these requiring suitable end fittings for their proper installation.

In the accompanying drawing, Figures 1 through 4 are partially sectioned views of four examples of the present invention.

More specifically, Figure 1 shows a flexible conduit 1. This conduit is made from a dense elastic rubber compound, and is already vulcanized. Such compounds are familiar to those skilled in the art.

The end fitting 2 shown on the end of this conduit 1 is characterized in that it is die cast directly onto the outside of the conduit. It has been found that this can be done without materially altering the physical or chemical characteristics of the rubber compound in any manner. In other words, the outside of the conduit 1 is of substantially the same character throughout including the part to which the end fitting is cast.

Furthermore, as the end fitting 2 cools after being die cast it shrinks somewhat and this causes the fitting 2 to constrict the part of the conduit 1 to which it is applied. A further feature is that due to the fact that the end fitting 2 is applied in a liquid state it fits the outside of the conduit 1 with such exactness as to adhere very firmly to the same.

The form of the end fitting 2 will vary in many instances. For illustrative purposes it is shown as including a threaded end $2^a$ and a flat-sided portion $2^b$ which provides a purchase for a wrench. In addition it includes an internal flange $2^c$ which provides a hole of the same diameter as the inside diameter of the conduit 1 and which protects the end edge of the latter.

Figure 2 illustrates substantially the same thing as has been above discussed excepting that a coil spring 3 is shown encircling the conduit 1 adjacent its end, the end fitting 2 being die cast about the outside of the conduit 1 so as to encase it from its end and at least a portion of the spring 3 most adjacent this end. This spring functions to prevent too abrupt bending of the conduit 1 at its junction with the end fitting.

Figure 3 illustrates the conduit 1 as being provided with a circumferential recess $1^a$ adjacent its end. The end fitting 2 is die cast about this end and is the same as already described excepting that it is die cast into the recess $1^a$ so as to provide an interlock.

In the example illustrated by Figure 4 a nipple 4 is fitted into the inside of the conduit 1 at its end, this nipple being provided with a right angular flange $4^a$ that is of greater diameter than the outside of the conduit 1. An end fitting 5 is die cast about the end of the conduit 1 in this example, this fitting differing from the fitting 2 in that it is not provided with the internal flange $2^c$, the flange $4^a$ of the nipple 4 protecting the end of the conduit. Since this flange $4^a$ is of greater diameter than the outside of the conduit 1, the metal of the fitting 5 flows about its periphery and provides an interlock. A further feature is the fact that the nipple 4 provides an internal rigid wall so that the constricting caused by the cooling of the end fitting 5 places the rubber compound of the conduit 1 under a greater compression than is the case in the other examples. It is to be noted that the part of the conduit 1 about which the end fitting 5 is die cast is slightly enlarged and that the inside end of this fitting is locked about this enlarged end.

We claim:

The combination of an enlongated flexible element having at least a rubber compound outer portion provided with a circumferential recess adjacent its end and a die cast end fitting in direct contact with said outer portion at said end and extending into said recess, said outside being of substantially the same character throughout including its part in contact with said end fitting.

ALAN E. BRICKMAN.
GEORGE A. GLEASON.